(12) United States Patent
Malinin

(10) Patent No.: US 8,651,741 B2
(45) Date of Patent: Feb. 18, 2014

(54) HYDRODYNAMIC FOIL BEARING ASSEMBLY

(75) Inventor: Vitaly Malinin, Moscow (RU)

(73) Assignee: Siemens Aktiengesellschaft, Munich (DE)

( * ) Notice: Subject to any disclaimer, the term of this patent is extended or adjusted under 35 U.S.C. 154(b) by 96 days.

(21) Appl. No.: 13/138,598

(22) PCT Filed: Mar. 11, 2009

(86) PCT No.: PCT/RU2009/000116
§ 371 (c)(1),
(2), (4) Date: Sep. 9, 2011

(87) PCT Pub. No.: WO2010/104411
PCT Pub. Date: Sep. 16, 2010

(65) Prior Publication Data
US 2011/0317948 A1    Dec. 29, 2011

(51) Int. Cl.
*F16C 32/06* (2006.01)

(52) U.S. Cl.
USPC .................................... 384/103; 384/104

(58) Field of Classification Search
USPC ......... 384/100, 103, 104, 114, 241, 286, 313, 384/316, 322, 397, 398, 399
See application file for complete search history.

(56) References Cited

U.S. PATENT DOCUMENTS

| 4,767,222 | A | | 8/1988 | Paletta et al. |
| 4,818,123 | A | * | 4/1989 | Gu ................................. 384/106 |
| 5,658,079 | A | | 8/1997 | Struziak et al. |
| 5,827,040 | A | | 10/1998 | Bosley et al. |
| 5,885,004 | A | * | 3/1999 | Scharrer et al. ................. 384/99 |
| 7,056,025 | B2 | | 6/2006 | Nakata |
| 2005/0013515 | A1 | * | 1/2005 | Nakata .......................... 384/103 |

FOREIGN PATENT DOCUMENTS

| EP | 0 812 996 A2 | 12/1997 |
| RU | 2192569 C2 | 11/2002 |

OTHER PUBLICATIONS

International Search Report for PCT/RU2009/000116; mailed Nov. 27, 2009.
Russian Decision on Grant mailed Jan. 30, 2013 for corresponding Russian Application No. 2011141103.

* cited by examiner

*Primary Examiner* — Marcus Charles
*Assistant Examiner* — Adam D Rogers
(74) *Attorney, Agent, or Firm* — Staas & Halsey LLP

(57) ABSTRACT

A bearing housing of a hydrodynamic foil bearing assembly has an opening for allowing flow of a fluid into the bearing housing. Also included in the a hydrodynamic foil bearing assembly is at least one foil having at least one opening and defining a cylindrical hollow space for receiving a rotating shaft therein. Fluid is supplied from the opening of the bearing housing to a gap between the at least one foil and the rotating shaft through the at least one opening of the at least one foil to form a pressurized fluid film therein.

15 Claims, 10 Drawing Sheets ured fluid film in the gap prevents dry friction by preventing the contact of the rotating shaft and the foil and thereby, reducing the surface wear of the foil bearing. Additionally, the formation of a pressurized fluid film in the gap prevents dry friction and thereby, reducing the surface wear of the foil bearing, preventing contact of the rotating shaft and the foil.

According to an embodiment, the fluid is supplied from the opening of the bearing housing to the gap between the at least one foil and the rotating shaft during a start-up cycle and a shut-down cycle.

This enables reducing dry friction by preventing the contact of the rotating shaft and the foil during the start-up and shut-down cycle.

According to another embodiment, the fluid is supplied by a channel for transporting the fluid from the opening of the bearing housing, at least one connector, the connector including at least one member, the at least one member receiving fluid from the channel, and at least one foil leg including a channel at one end and engaged with the opening of the at least one foil at another end, the channel having inserted at an end therein the at least one member.

Thereby, supplying the fluid to the foil without influencing the performance of the foil.

According to yet another embodiment, the bearing housing further includes bushing plates disposed within the bearing housing, the bushing plates including a claw, and grooves to receive the claw of the bushing plates.

According to yet another embodiment, the bushing plates further includes at least one aperture to allow insertion of the at least one member into the end of the channel of the at least one foil leg.

Thus, preventing deformation of the members and, thus, securing the position of the members and orientation of fluid flow geometry.

According to yet another embodiment, the bushing plates further includes an aperture for allowing the fluid to flow to the at least one connector.

According to yet another embodiment, the connector is made of an elastic material.

Thus, preventing the influence of the members on the performance of the foil.

According to yet another embodiment, the at least one connector comprises a cap, the cap comprising a cavity for distributing the fluid to the at least one member.

According to yet another embodiment, the at least one connector further comprises an aperture to enable flow of the fluid to the cap.

According to yet another embodiment, the opening of the least one foil is a slot extending longitudinally.

According to yet another embodiment, the hydrodynamic foil bearing assembly further comprises spacer bars fastened to the slots of the at least one foil to provide a constant slot clearance.

According to yet another embodiment, the at least one foil is a bump foil.

According to yet another embodiment, the bump foil includes a split extending longitudinally, for providing increased stiffness.

According to yet another embodiment, the hydrodynamic foil bearing assembly further includes a spacer spring mounted over the bump foil, wherein the spacer spring includes a bridge and the bridge is aligned above the spilt to prevent leakage of fluid from the gap.

According to yet another embodiment, the fluid is air.

HYDRODYNAMIC FOIL BEARING ASSEMBLY

CROSS REFERENCE TO RELATED APPLICATIONS

This application is the U.S. national stage of International Application No. PCT/RU2009/000116 filed on Mar. 11, 2009, and claims the benefit thereof.

BACKGROUND

Described below is a hydrodynamic boil bearing assembly for use in rotating machinery.

Hydrodynamic foil bearings have been suggested to improve the performance of ordinary hydrodynamic bearings for high speed rotating systems. The principle of operation of foil bearings is based on formation of a pressurized fluid film in the annular gap between an outer periphery of a rotating shaft and a bearing surface formed by either a plurality of foils or a single bump foil. This pressurized fluid film works as lubrication layer, reducing frictional force between the outer periphery of the rotating shaft and the inner wall surface of the foil during operation and allows the bearing to effectively support a high load. Due to this pressurized fluid film, the rotating shaft rotates while floating in the air and maintains a predetermined distance from the foil. The pressurized fluid film in the annular gap between the outer periphery of the rotating shaft and the inner wall surface is formed when the rotating shaft rotates at a certain speed.

A potential advantage provided by the foil bearings over the hydrostatic bearings is the absence of external pressurized fluid supply that significantly simplifies hydrodynamic bearing application for rotating machinery. Moreover due to the flexibility of the foil, such type of bearings are less sensitive to surface finish quality and possible rotating shaft and housing axial misalignment during assembling. Additionally, the use of foil bearings provide desired bearing stiffness characteristics and instabilities dumping.

The pressurized fluid film is formed in the gap between the outer periphery of the rotating shaft and the foil only when the rotating shaft rotates at a certain speed. In order to reach the certain speed, the rotating shaft is to be accelerated from zero rotating speed. At zero rotating speed, as there is no pressurized fluid film in the gap, the outer periphery of the rotating shaft is in direct contact with the inner wall surface of the foil. This leads to dry friction during the start-up and shut-down cycles that inevitably results in intensive surface wear of the foil bearing. Thus, the maximum service life is defined primarily by the strength of the bearing material or in other words by the whole number of start-up and shut-down cycles.

SUMMARY

It is desirable to eliminate or at least minimize the above mentioned problems.

This is achieved by a hydrodynamic foil bearing assembly including a bearing housing, the bearing housing including an opening for allowing flow of a fluid into the bearing housing, at least one foil, the at least one foil including at least one opening and defining a cylindrical hollow space for receiving a rotating shaft therein, and a fluid supply for supplying the fluid from the opening of the bearing housing to a gap between the at least one foil and the rotating shaft through the at least one opening of the at least one foil to form a pressurized fluid film therein.

Thereby, enabling additional supply of lubricant to the gap between the outer periphery of the rotating shaft and the inner wall surface of the foil. Moreover, the formation of a pressur-

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
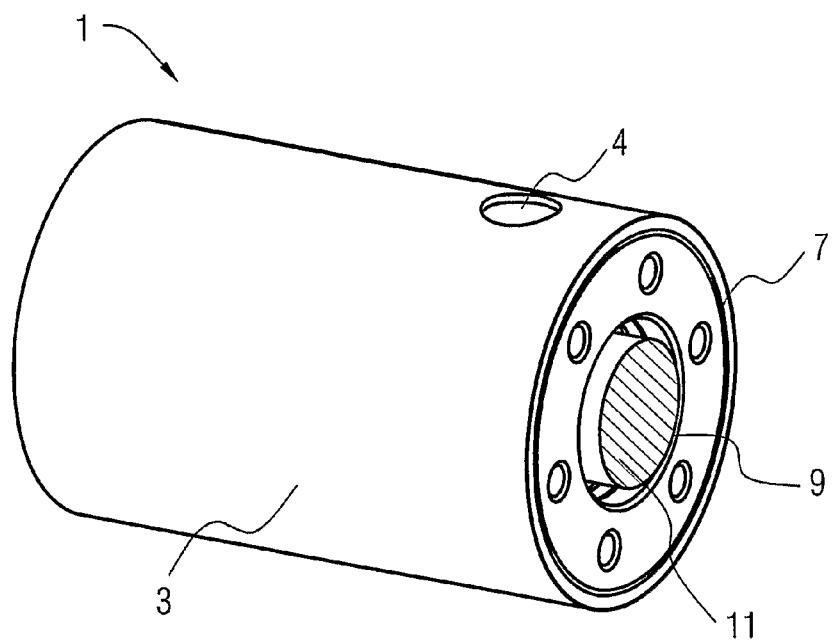
FIG. 1 is a perspective view of a hydrodynamic foil bearing assembly in accordance with an embodiment herein.

Reference will now be made in detail to the preferred embodiments, examples of which are illustrated in the accompanying drawings, wherein like reference numerals refer to like elements throughout.

Various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

FIG. 1 illustrates a perspective view of a hydrodynamic foil bearing assembly in accordance with an embodiment herein. The hydrodynamic foil bearing assembly 1 ves a bearing housing 3 and an opening 4. The bearing housing 3, typically, has a cylindrical hollow cross-section and at least one foil (not shown) defining a cylindrical hollow space for receiving a rotating shaft 11 is disposed inside the bearing housing 1. A gap is defined between the inner wall surface of the at least one foil and the outer periphery of the rotating shaft 11.

In an implementation a plurality of foils may be disposed inside the bearing housing such that the inner wall surfaces of the foils define the cylindrical hollow space for receiving the rotating shaft 11. In an alternative implementation, a bump foil may be disposed inside the bearing housing 1. The inner wall surface of the bump foil defines the cylindrical hollow space for receiving the rotating shaft 11.

The bearing assembly 1 is tightened using nuts 7 at the ends. The nuts 7 have an opening 9, such that a rotating shaft 11 may be inserted into the bearing assembly 1. Fluid may be supplied inside the bearing housing 3 via the opening 4.

The fluid supplied into the bearing housing 3 is directed internally into the gap between the inner wall surface of the at least one foil and the outer periphery of the rotating shaft 11 though an opening in the at least one foil. The fluid in the gap forms a pressurized film and thus, acts as a lubricant between the inner wall surface of the at least one foil and outer periphery of the rotating shaft 11. Moreover, the pressurized fluid film prevents contact of the outer periphery of the shaft with the inner wall surface of the at least one foil.

In an embodiment, the fluid may be supplied into the gap between the inner wall surface of the foil and the outer periphery of the rotating shaft 11 during a start-up and a shut-down cycle of the rotating shaft 11. During the start-up or the shut-down cycle, the rotation speed of the rotating shaft 11 is below a critical speed. This prevents the contact of the outer periphery of the rotating shaft 11 with the inner wall surface of the at least one foil and thus decrease dry friction.

In the present embodiment, the fluid supplied to the bearing assembly 1 is air. However, other gases or liquids suitable for acting as a lubricant may be supplied into the bearing housing 3. The air may be supplied form a pneumatic system via the opening 4.

Figure 2A:
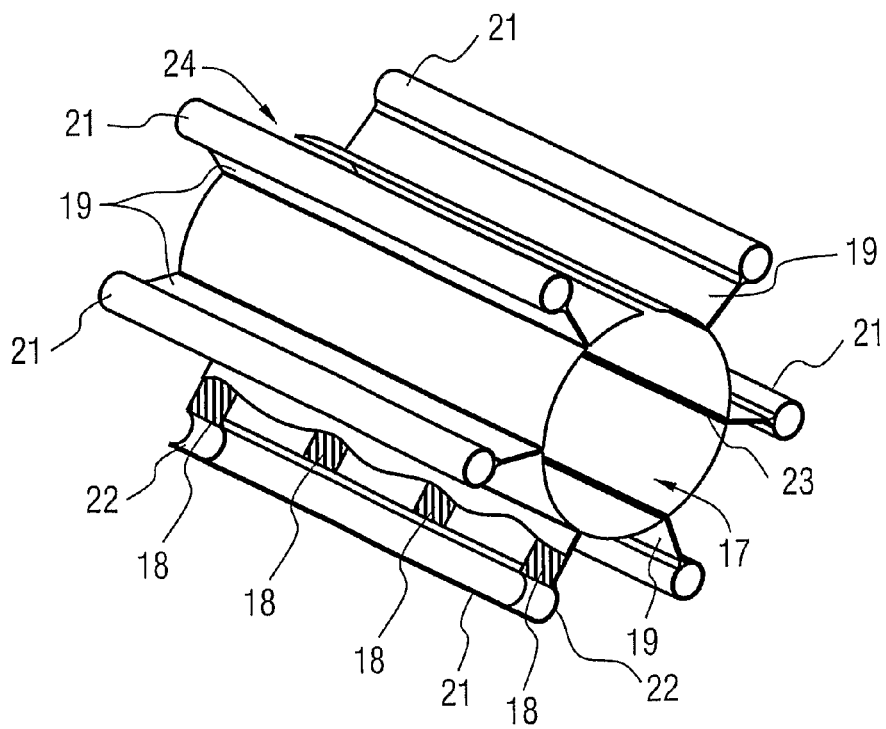
FIG. 2a is a perspective view of a bump foil engaged with a plurality of foil legs in accordance with an embodiment herein.

FIG. 2a illustrates a bump foil engaged with a plurality of foil legs in accordance with an embodiment. The bump foil 15 typically, has a cylindrical hollow cross section defining a cylindrical hollow space 17. The hollow cylindrical space 17 of the bump foil 15 receives the rotating shaft 11 of FIG. 1 when the later is inserted into bearing assembly 1 through the opening 9 of FIG. 1 of the nut 7 of FIG. 1. Foil legs 19 are engaged with the bump foil 15 at one end through slots 23 defined on the bump foil 15. The other end of the of the foil legs 19 include a channel 21. The channel 21 has sealing bushings 22 braised at both ends. The foil legs 19 are braised from both sides in order to provide overall impermeability. The geometry of the foil legs 19 may be varied depending on the desired fluid pressure required at the slots 23.

Figure 2B:
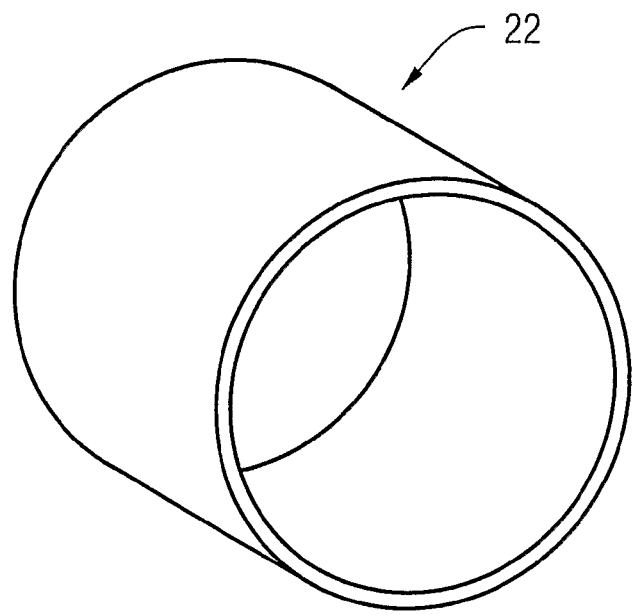
FIG. 2b is a perspective view of a sealing bushing in detail.

FIG. 2b illustrates the sealing bushing 22 in detail. The sealing bushing 22 has a cylindrical hollow cross section and is braised at the ends of the cylindrical channel 21 of the foil leg 19.

Figure 2C:
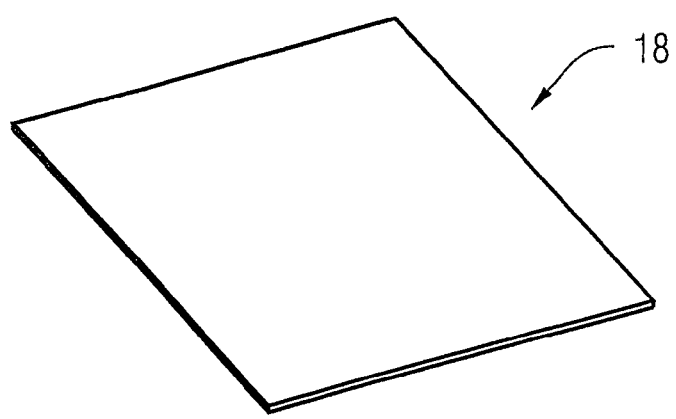
FIG. 2c is a perspective view of a spacer bar in detail.

Referring again to FIG. 2a, the bump foil 15 is bended from a thin sheet metal, for example, steel. Spacer bars 18 are either braised or fastened with spot welding into the slots 23 on the bump foil 15. For an example, the spacer bars 18 may be braised or fastened with spot welding into the slots 23 during bending of the bump foil 15. The spacer bars 18 secure constant slot clearance providing desired cross section area and geometry of flow passage for the fluid. The number of spacer bars 18 fastened or braised may be varied depending on the desired fluid pressure required at the slots 23. FIG. 2c illustrates the spacer bar 18 in detail.

As described in more detail below with reference to FIGS. 2a, 3 and 6a, fluid from opening 4 passes through channel 25 to a circular cavity in cap 37 which distributes the fluid via members 32 to the channels 21 of the foil legs 19 via which the fluid is injected into the gap between the inner wall surface of the bump foil 15 and the outer periphery of the rotating shaft 11 via the flow passages defined between the spacer bars 18, thereby providing means for supplying the fluid to the gap. The bump foil 15 also has a split 24 for providing a desired stiffness. The split 24 allows radial deformation of the bump foil 15 during the rotation of the rotating shaft 11, and thus, providing the desired stiffness and minimizing damage.

Figure 3:
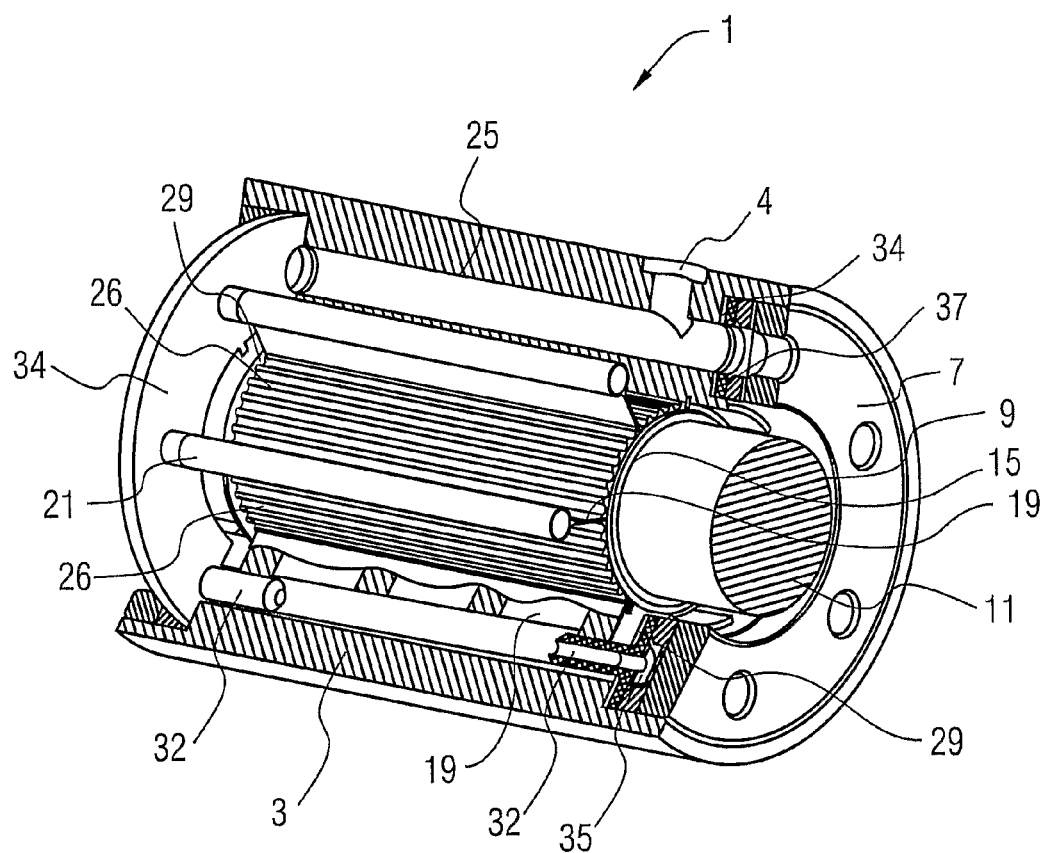
FIG. 3 is a perspective sectional view of the hydrodynamic foil bearing assembly 1 of FIG. 1.

FIG. 3 illustrates a sectional view of the hydrodynamic foil bearing assembly 1 of FIG. 1. The shown FIG. 3 illustrates, the sectional view of the bearing assembly 1 including the bearing housing 3, opening 4, bump foil 15, and the rotating shaft 11 inserted into the bearing housing 3 though the opening 9 in the nut 7 and receiving by the bump foil 15.

The channel 25 provides a flow passage for the fluid supplied in. Springs 26 are mounted over the bump foil 15. The springs 26 enable damping of vibrations by providing additional stiffness to the bump foil 15. Additionally, the springs 26 provide appropriate clearance between the outer periphery of the bump foil and an inner wall surface of the bearing housing 3.

Figure 4A:
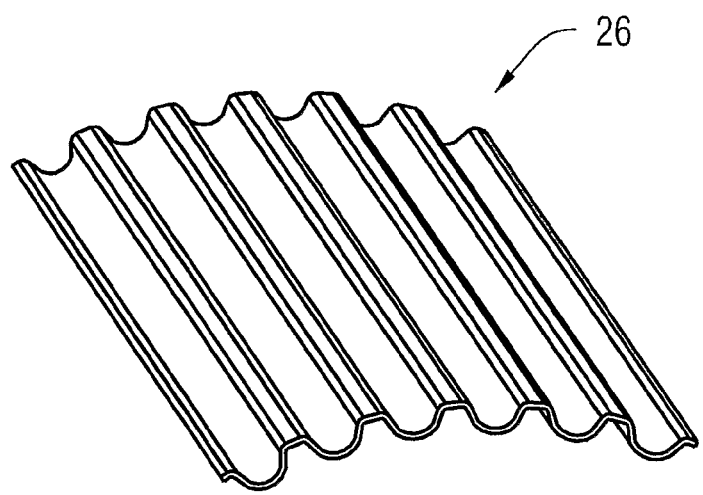
FIG. 4a is a perspective view of a spring in detail.

FIG. 4a illustrates a spring 26 in detail. The spring 26 is bended from a thin sheet metal, for example, steel, and includes a periodical profile.

Referring again to FIG. 3, a spacer spring 27 including a bridge (not shown) is mounted over the bump foil 15 such that the bridge of the spacer spring 27 is aligned above the split 24 of FIG. 2a of the bump foil 15. The bridge prevents contact of the outer periphery of the rotating shaft 11 and an inner wall surface of the spacer spring 27 though the gap of the split 24. Additionally, appropriate design of the bridge may decrease leakage of the fluid from the bump foil 15 through the split 24. Slot washers 29 securely hold the bump foil 15, springs 26 and spacer spring 27 inside the bearing housing 3. Slot washers 29 are positioned in grooves (not shown) provided on an inner surface of the bearing housing 3.

Figure 4B:
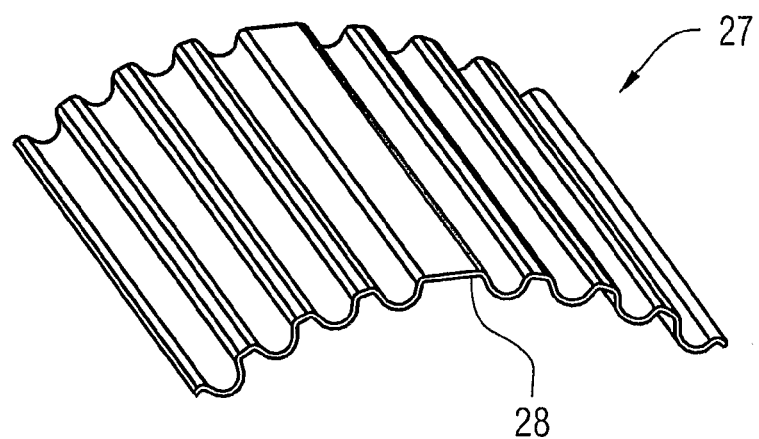
FIG. 4b is a perspective view of a spacer spring in detail.

FIG. 4b illustrates a spacer spring 27 in detail. The spacer spring 27 is bended from a thin sheet metal, for example, steel, and includes a bridge 28. The bridge 28 prevents contact of the outer periphery of the rotating shaft 11 and an inner wall surface of the spacer spring 27 though the gap of the split 24 of FIG. 2a.

Figure 5:
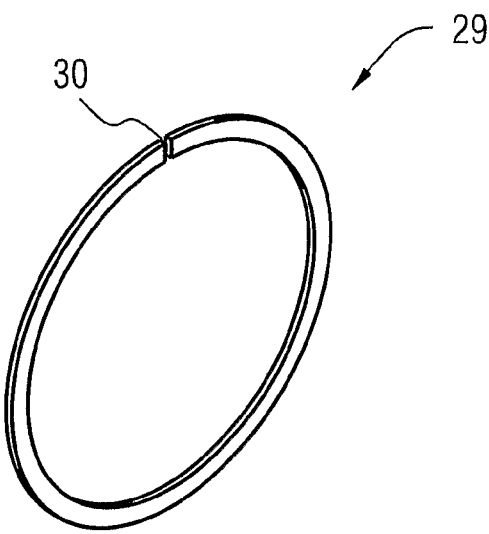
FIG. 5 is a perspective view of a slot washer 29 in detail.

FIG. 5 illustrates a slot washer 29 in detail. The slot washer 29 includes a slot 30 and is positioned into a groove provided on the inner surface of the bearing housing 3 of FIG. 3.

Referring again to FIG. 3, connectors are provided inside the bearing housing 3 to supply to the channels 21 of the foil legs. The connectors include members 32, which are inserted into the ends of the channels 21 of the foil legs 19. The members supply the fluid into the channels 21 of the foil legs 19. Bushing plates 34 are arranged inside the bearing housing 3. The members 32 of the connectors 31 are inserted into the ends of the cylindrical channel 21 of the foil leg 19 through apertures in the bushing plates 34. The bushing plates 34 prevent deformation of the members 32 and, thus, secure the position of the members 32 and orientation of fluid flow geometry.

The connectors 31 include a cap 37 having a circular cavity. The circular cavity of the cap distributes the fluid to the members 32. The members 32 in turn supply the fluid to the channels 21 of the foil legs 19. Fluid from the channel 25 is supplied to the cap 37 through an aperture 42 in the bushing plate 34 and an aperture 33 in the connector 31.

Space sleeves 35 are inserted into each of the members 32 in order to provide a constant fitting flow area during rubber warping, in process of tightening of the nuts 7. The bearing assembly is tightened using the nuts 7 at the ends.

Figure 6A:
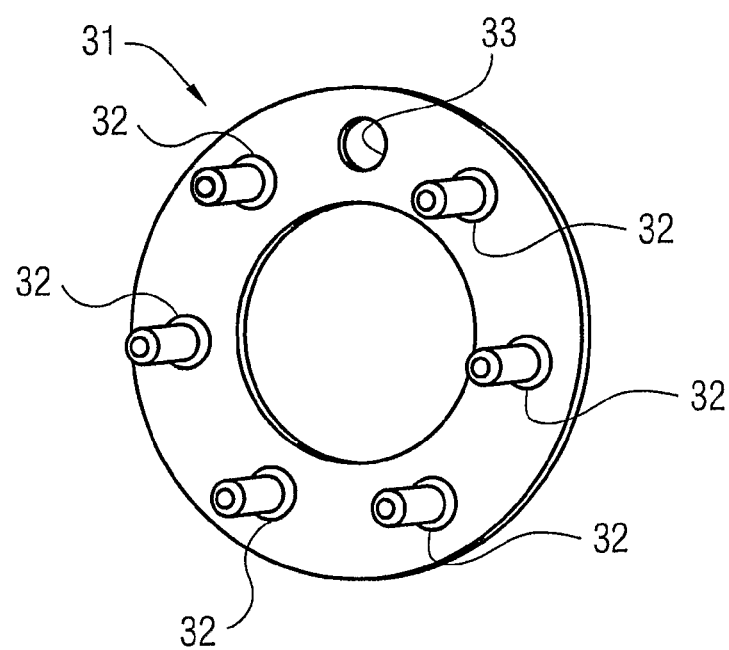
FIG. 6a is a perspective view of a connector in detail.

FIG. 6a illustrates a connector in detail. The connector 31 includes a plurality of members 32. The members 32 are inserted into the ends of the channel 21 of FIG. 3 of the foil legs 19 of FIG. 3 and thus supply the fluid from the opening 4 of FIG. 3 to the channels 21. The aperture 33 allows flow of the fluid to the cap 37 of FIG. 3. The connector 31 may be fabricated from an elastic material, for example, a heat-resistant rubber, such as an organosilicon rubber or a heat-resistant and elastic plastic. Alternatively, connectors 31 may be fabricated from any heat-resistant and elastic material, such that the connectors 31 are capable of withstanding the operating pressure of the fluid. The elastic property of the connectors 31 provides substantial flexibility to the fluid supply mechanism and thus, preventing the influence of the members 32 on the performance of the bump foil 15 of FIG. 3.

Figure 6B:
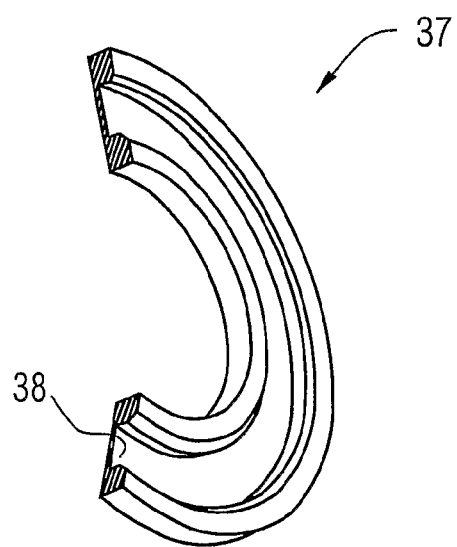
FIG. 6b is a perspective sectional view of a cap in detail.

FIG. 6b illustrates a cap 37 in detail. The cap 37 includes a circular cavity 38 for distributing the fluid to the members 32 of FIG. 6a of the connector 31 of FIG. 6a.

Figure 7:
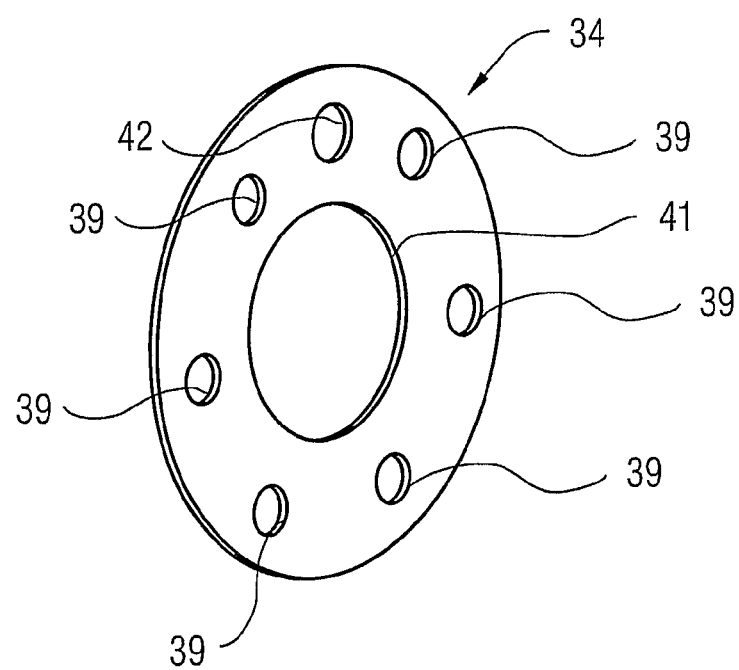
FIG. 7 is a perspective view of a bushing plate in detail.

FIG. 7 illustrates a bushing plate 34 in detail. The bushing plate 34 includes a plurality of apertures 39. The members 32 of FIG. 6 are inserted into the ends of the channels 21 of FIG. 3 through the apertures 39. The aperture 42 allows flow of the fluid from the channel 25 of FIG. 3 to the aperture 33 of FIG. 6 of the connector 31 of FIG. 6.

Figure 8:
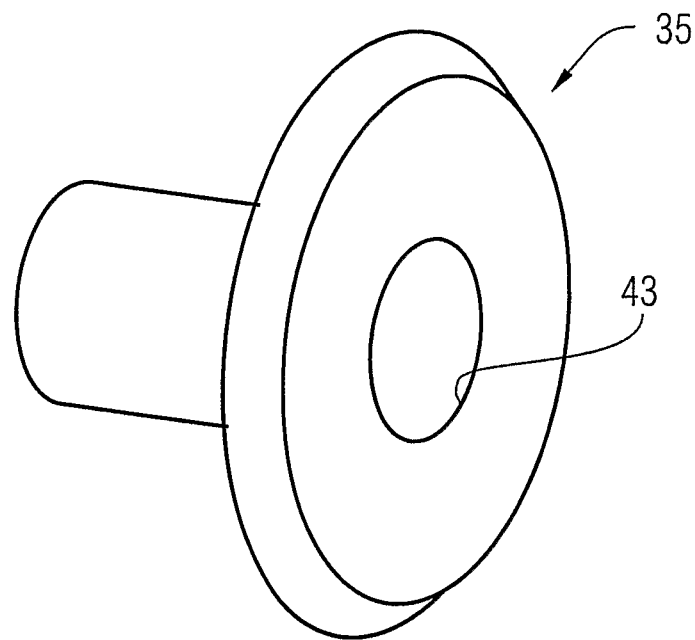
FIG. 8 is a perspective view of a space sleeve in detail.

The bushing plate 34 includes a claw 41 for securing the bushing plate 33 inside the bearing housing 3 of FIG. 3. The claw 41 is received by a grove provided on the bearing housing 3 and is thus, securely positioned FIG. 8 illustrates a space sleeve 35 in detail. The space sleeve 35 includes an opening 43 and is inserted into a member 32 of FIG. 6 of the connectors 31 of FIG. 6 through the opening 43.

Referring again to FIG. 3, the rotating shaft 11 on being inserted into the bearing housing 3 through the opening 9 in the nut 7 is received by the cylindrical hollow space defined by the bump foil 15. A gap is formed between the outer periphery of the rotating shaft 11 and the inner wall surface of the bump foil 15.

Figure 9:
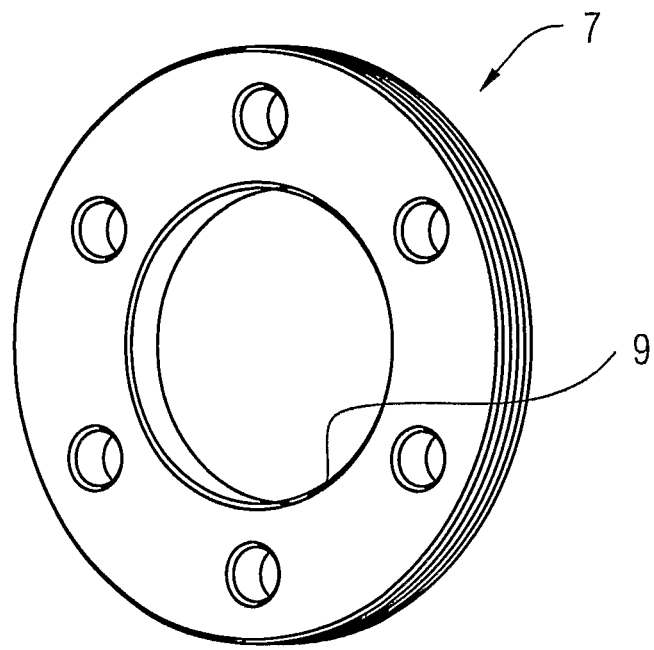
FIG. 9 is a detailed perspective view of view of a nut.

FIG. 9 is a detailed view of a nut 7. The nut 7 includes an opening 9 through which the rotating shaft 11 of FIG. 3 may be inserted into the bearing assembly 1 of FIG. 3. The nut 7 is used for tightening the bearing assembly 1.

Figure 10:
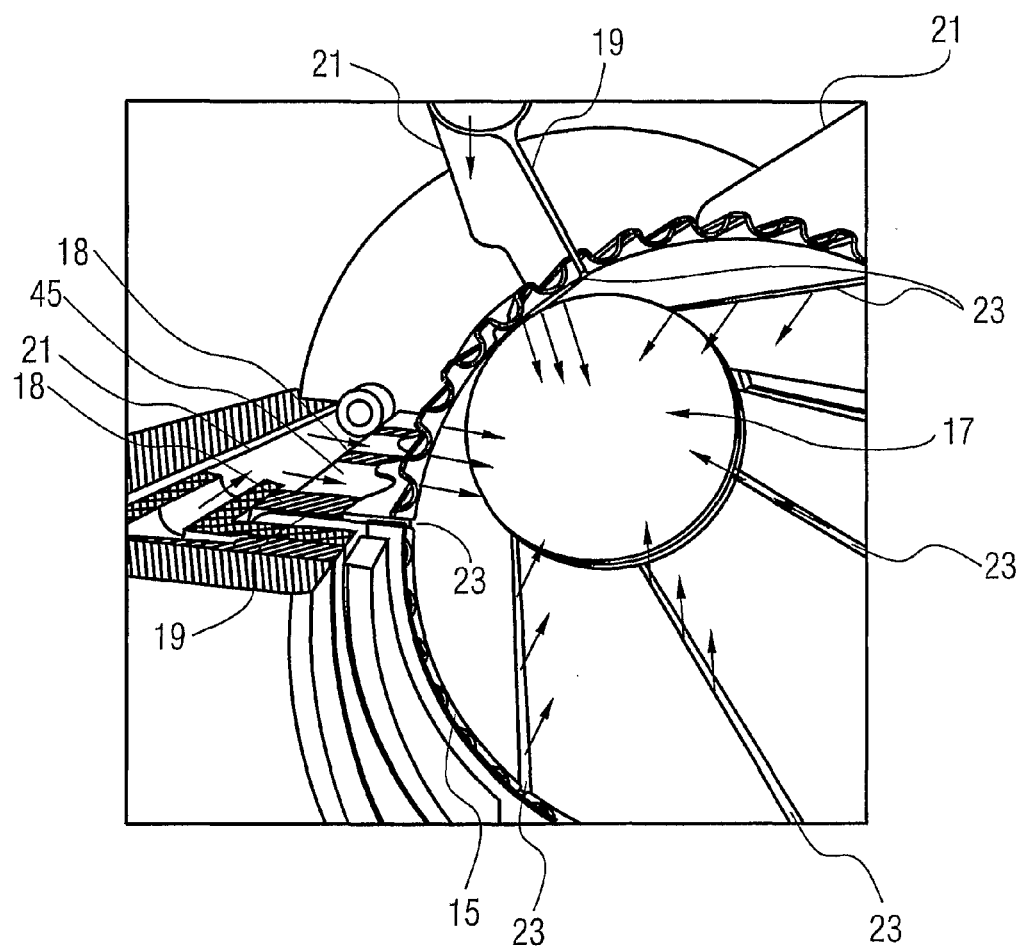
FIG. 10 is a perspective view of an injection of a fluid from the channels the of foil legs into a cylindrical hollow space defined by a bump foil.

FIG. 10 illustrates the injection of a fluid from the channels 21 of the foil legs 19 into the cylindrical hollow space 17 defined by the bump foil 15. The hollow space 17 receives the rotating shaft 11 of FIG. 3 and the gap is formed between the outer periphery of the rotating shaft 11 and the inner wall surface of the bump foil 15. The fluid injected into the cylindrical hollow space 17 forms a pressurized film in the gap. For the purpose of understanding, the rotating shaft 11 of FIG. 3 and the gap is not shown. Fluid from the channels 21 of the foil legs 19 is injected into the cylindrical hollow space 17 via the slots 23 of the bump foil 15. The fluid from the channels 21 is injected to the slots 23 via flow passages 45 defined by the spacer bars 18. The arrows indicate the flow of the fluid into the hollow cylindrical space 17.

Fluid injected into the cylindrical hollow space member 17 forms a pressurized fluid film in the gap between the inner wall surface of the bump foil 15 and the outer periphery of the rotating shaft 11 of FIG. 3. In an implementation, fluid may be injected into the gap between rotating shaft 11 and the cylindrical hollow member 17 to form a pressurized fluid film only during a start-up and shut-down cycle, and thus, avoiding the need of a constant pressurized fluid supply. In order to supply the fluid only during the start-up and shut-down cycle the opening 4 on the bearing housing may be blocked when the rotating shaft 11 is rotating. Fluid supply to the bearing housing 3 of FIG. 1 may be blocked by blocking the opening 4 of FIG. 3 of the bearing housing 3 of FIG. 3.

The pressurized fluid film formed in the gap acts as a lubricant between the outer periphery of the rotating shaft and the inner wall surface of the bump foil 15. Additionally, the pressurized fluid film in the gap moves prevents contact of the outer periphery of the rotating shaft 11 of FIG. 3 and the inner wall surface of the bump foil 15. This minimizes dry friction between the rotating shaft 11 and the bump foil 15 during the start-up and shut-down cycles. Therefore, the life of the bump foil 15 is increased as the intensive surface wear is minimized.

Figure 11:
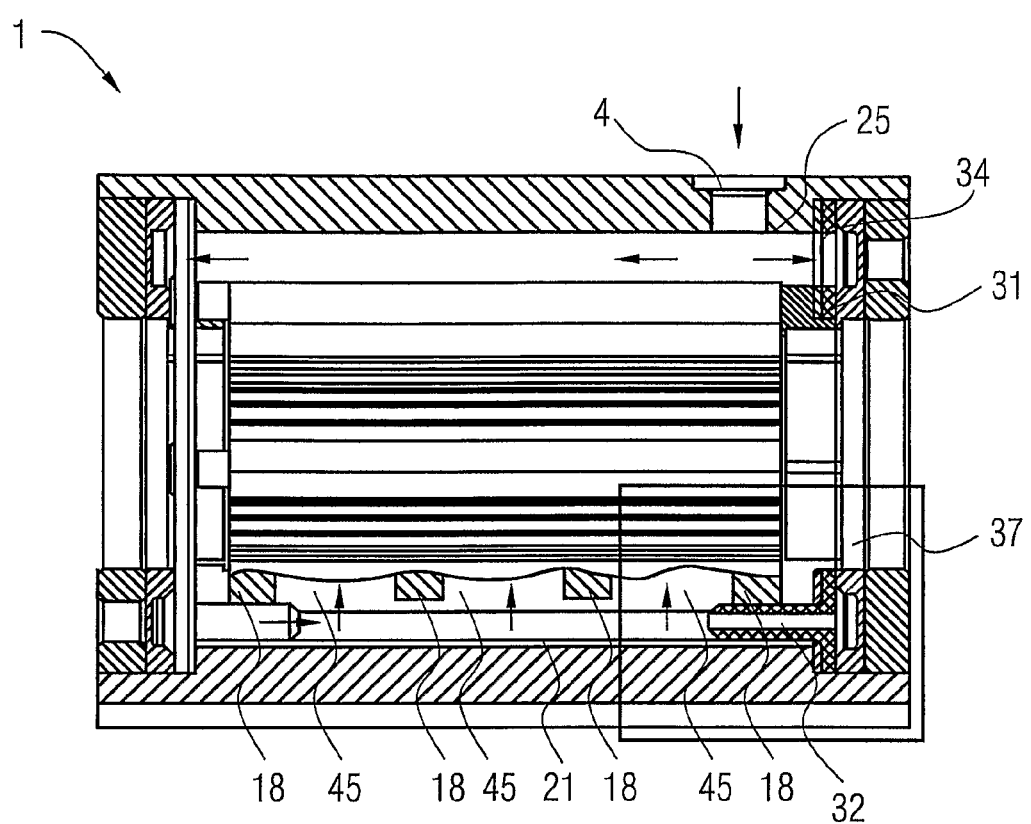
FIG. 11 is a sectional view of the bearing assembly illustrating a detailed mechanism of the fluid supply.

FIG. 11 is a sectional view of the bearing assembly 1 illustrating a detailed mechanism of the fluid supply. The opening 4 acts as an intake and the fluid is supplied into the bearing assembly through the opening 4. From the opening 4, the fluid flows through the channel 25. Thereafter, the fluid is supplied to the cap 37 through the aperture 42 of FIG. 7 of the bushing plate 34 and the aperture 33 of FIG. 6*a* of the connector 31. The cap 37 distributes the fluid to the members 32 of the connectors 31. The members 32 supply the fluid to the channels 21 of the foil legs. Fluid from the channels 21 is injected into the slots 23 of FIG. 2*a* of the bump foil 15 of FIG. 2*a*. The arrows indicate the direction of flow of the fluid inside the bearing assembly 1.

Figure 12:
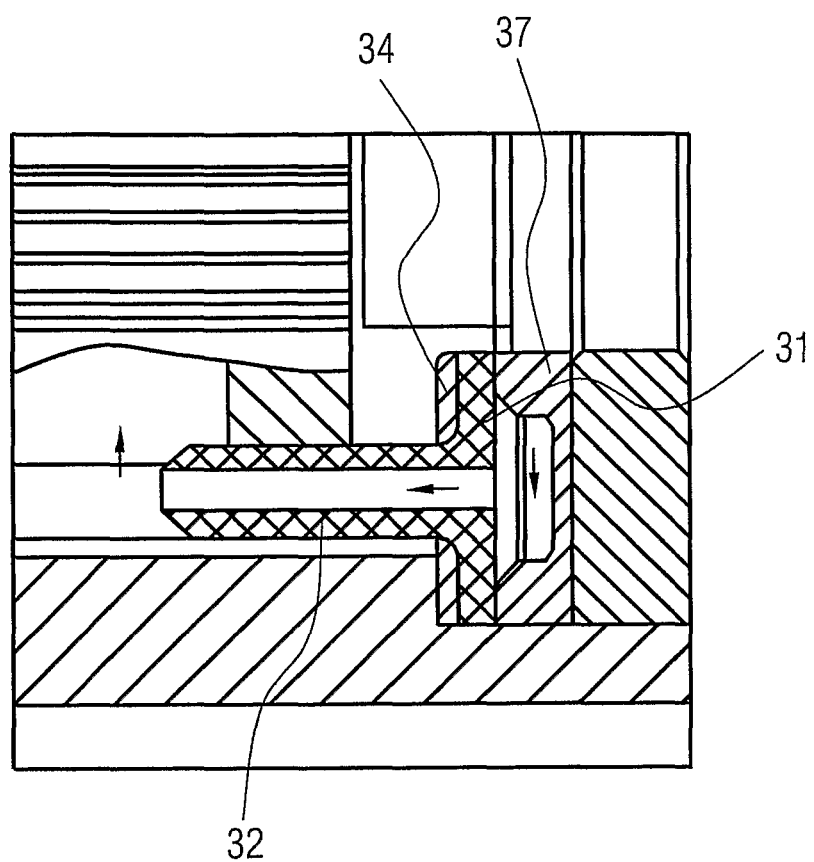
FIG. 12 is an enlarged view of the area within the rectangle of FIG. 11.

FIG. 12 is an enlarged view of the encircled area of FIG. 11. The fluid from the channel 25 of FIG. 11 is provided to the cap 37 aperture 42 of FIG. 7 of the bushing plate 34 and the aperture 33 of FIG. 6*a* of the connector 31. Thereafter, the fluid is distributed to the cylindrical channel 21 through the members 32 of the connector 31. From the cylindrical channel 21, the fluid is injected into the bump foil 15 of FIG. 2*a*. In the illustrated FIG. 12, the arrows indicate the direction of flow of the fluid.

The embodiments described herein provide additional supply of lubricant to the gap between the outer periphery of the rotating shaft and the inner wall surface of the foils or bump foil in a hydrodynamic foil bearing. This lubricant may be supplied either during start-up and shut-down cycles, periodically or permanently depending on need. Moreover, the formation of a pressurized fluid film in the gap prevents dry friction by preventing the contact of the rotating shaft and the foil and thereby, reducing the surface wear of the foil bearing. Additionally, the supplying of pressurized fluid into the gap during bearing operation increases the bearing load capacity significantly.

While this invention has been described in detail with reference to certain preferred embodiments, it should be appreciated that the present invention is not limited to those precise embodiments. Rather, in view of the present disclosure which describes the current best mode for practicing the invention, many modifications and variations would present themselves, to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within the scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A hydrodynamic foil bearing assembly, comprising:
   a bearing housing having an opening allowing flow of a fluid into the bearing housing;
   at least one foil having at least one opening extending longitudinally and defining a cylindrical hollow space for receiving a rotating shaft therein; and
   means for supplying the fluid from the opening of the bearing housing to a gap between the at least one foil and the rotating shaft through at least one radially extending foil leg to the at least one opening of the at least one foil to form a pressurized fluid film therein.

2. The hydrodynamic foil bearing assembly of claim 1, wherein the fluid is supplied from the opening of the bearing housing to the gap between the at least one foil and the rotating shaft during a start-up cycle and a shut-down cycle.

3. The hydrodynamic foil bearing assembly according to claim 1, wherein said means includes:
   a fluid channel transporting the fluid from the opening of the bearing housing;
   at least one connector having at least one member receiving fluid from the channel; and
   the at least one radially extending foil leg having a foil leg channel at one end and engaged with the at least one opening of the at least one foil at another end, the foil leg channel having inserted at an end therein the at least one member.

4. The hydrodynamic foil bearing assembly according to claim 3, wherein the bearing housing further comprises:
   bushing plates, disposed within the bearing housing, including a claw; and
   grooves to receive the claw of the bushing plates.

5. The hydrodynamic foil bearing assembly according to claim 4, wherein the bushing plates further include at least one aperture to allow insertion of the at least one member into the end of the foil leg channel of the at least one radially extending foil leg.

6. The hydrodynamic foil bearing assembly according to claim 5, wherein the bushing plates further include a flow aperture allowing the fluid to flow to the at least one connector.

7. The hydrodynamic foil bearing assembly according to claim 3, wherein the at least one connector is made of an elastic material.

8. The hydrodynamic foil bearing assembly according to claim 3, wherein the at least one connector has a cap with a cavity for distributing the fluid to the at least one member.

9. The hydrodynamic foil bearing assembly according to claim 8, wherein the at least one connector further includes an aperture to enable flow of the fluid to the cap.

10. The hydrodynamic foil bearing assembly according to claim 1, wherein the opening of the at least one foil is a slot extending longitudinally.

11. The hydrodynamic foil bearing assembly according to claim 10, further comprising spacer bars fastened to the slot of the at least one foil to provide a constant slot clearance.

12. The hydrodynamic foil bearing assembly according to claim 1, wherein the at least one foil is a bump foil.

13. The hydrodynamic foil bearing assembly according to claim 12, wherein the bump foil includes a split extending longitudinally and providing increased stiffness.

14. The hydrodynamic foil bearing assembly according to claim 13, further comprising a spacer spring mounted over the bump foil, the spacer spring including a bridge aligned above the spilt to prevent leakage of the fluid from the gap.

15. The hydrodynamic foil bearing assembly according to claim 1, wherein the fluid is air.

\* \* \* \* \*